US008369898B2

(12) United States Patent
Chun

(10) Patent No.: US 8,369,898 B2
(45) Date of Patent: Feb. 5, 2013

(54) PORTABLE TERMINAL WITH TOUCH SCREEN AND METHOD FOR DISPLAYING TAGS IN THE PORTABLE TERMINAL

(75) Inventor: Jin Wook Chun, Seoul (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 245 days.

(21) Appl. No.: 12/622,486

(22) Filed: Nov. 20, 2009

(65) Prior Publication Data

US 2010/0124946 A1    May 20, 2010

(30) Foreign Application Priority Data

Nov. 20, 2008   (KR) .................. 10-2008-0115531

(51) Int. Cl.
  *H04B 1/38* (2006.01)
  *H04M 1/00* (2006.01)
(52) U.S. Cl. ........................ 455/566; 345/173
(58) Field of Classification Search .............. 455/566; 345/173, 178, 179, 156, 157, 158, 159, 169; 715/787, 702, 798, 788, 800, 834, 815
See application file for complete search history.

(56) References Cited

U.S. PATENT DOCUMENTS

| 5,640,580 | A | 6/1997 | Slayden et al. | 395/789 |
|---|---|---|---|---|
| 7,884,805 | B2 * | 2/2011 | Thorn | 345/173 |
| 8,019,389 | B2 * | 9/2011 | Kim et al. | 455/566 |
| 2003/0071858 | A1 | 4/2003 | Morohoshi | |
| 2006/0026535 | A1 * | 2/2006 | Hotelling et al. | 715/863 |
| 2007/0247435 | A1 | 10/2007 | Benko et al. | |
| 2007/0252821 | A1 | 11/2007 | Hollemans et al. | |
| 2008/0174563 | A1 * | 7/2008 | Kim | 345/173 |
| 2008/0259042 | A1 | 10/2008 | Thorn | |
| 2008/0270886 | A1 | 10/2008 | Gossweiler et al. | |
| 2009/0213086 | A1 * | 8/2009 | Chae et al. | 345/173 |
| 2009/0289913 | A1 * | 11/2009 | Chang et al. | 345/173 |

FOREIGN PATENT DOCUMENTS

| CN | 1969254 A | 5/2007 |
|---|---|---|
| CN | 101291496 A | 10/2008 |
| EP | 0971285 | 1/2000 |
| EP | 1517228 | 3/2005 |
| EP | 1983416 | 10/2008 |

* cited by examiner

*Primary Examiner* — Andrew Wendell
*Assistant Examiner* — Chung-Tien Yang
(74) *Attorney, Agent, or Firm* — Cha & Reiter, LLC

(57) ABSTRACT

A portable terminal with a touch screen and a method for displaying tags on the touch screen of the portable terminal are disclosed. The method includes: calculating a distance between the first and second touch points detected on the touch screen; identifying the number of tags that will be displayed, according to the calculated distance; and displaying at least one of the identified number of tags.

24 Claims, 11 Drawing Sheets

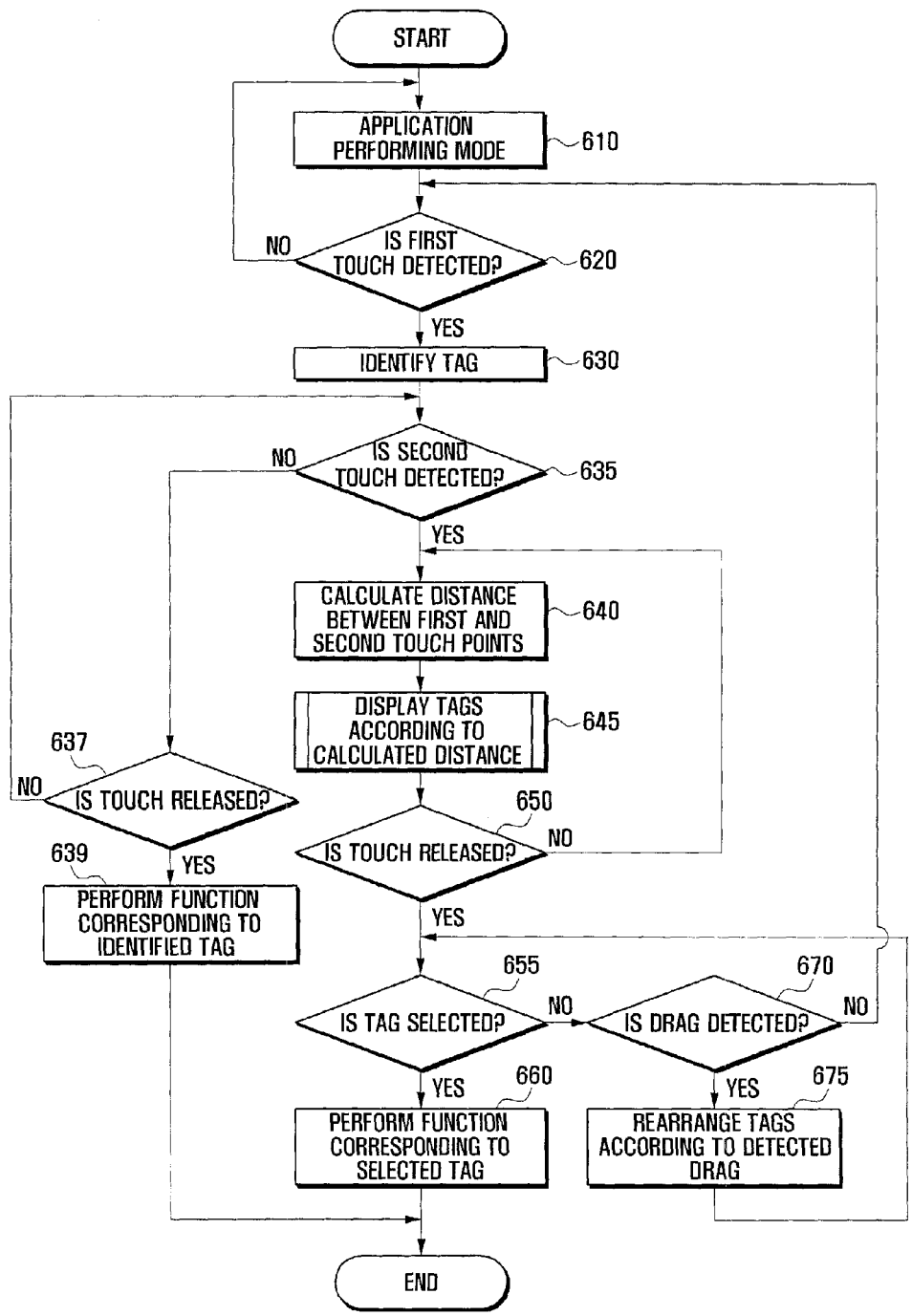

PORTABLE TERMINAL WITH TOUCH SCREEN AND METHOD FOR DISPLAYING TAGS IN THE PORTABLE TERMINAL

CLAIM OF PRIORITY

This application claims the benefit of the earlier filing date, pursuant to 35 USC §119(a), to that patent application entitled "PORTABLE TERMINAL WITH TOUCH SCREEN AND METHOD FOR DISPLAYING TAGS IN THE PORTABLE TERMINAL" filed in the Korean Intellectual Property Office on Nov. 20, 2008 and assigned Serial No. 10-2008-0115531, the contents of which are incorporated herein by reference.

BACKGROUND OF THE INVENTION

1. Field of the Invention

The present invention relates to portable terminals, and more particularly, to a portable terminal with a touch screen and a method for displaying tags on the touch screen of the portable terminal using a multi-touch detected on the touch screen.

2. Description of the Related Art

Portable terminals, such as cellular phones, personal digital assistances (PDA), MPEG-3 players, etc., have been developed with a plurality of functions and have included an input unit, such as a keyboard or a mouse etc., to allow a user to use those functions. The addition of keyboards and mice in the conventional portable terminals causes their size to be increased and causes a user to have difficulty carrying them. To resolve this problem, conventional portable terminals have been equipped with a touch screen instead of a keyboard or a mouse.

Touch screens are configured to combine an input unit with a display unit, where the input unit receives signals generated by a user tapping action and the display unit displays functions and data as the portable terminal is operated. Portable terminals with a touch screen provide a user interface that a user can intuitively recognize.

With the development of touch screen technology, touch screens can perform a multiple tapping recognition function that is called a multi-touch. Therefore, portable terminals with a touch screen can detect a multi-touch via the touch screen and perform a corresponding function. Multi-touch means that multiple tapping points are touched on the touch screen.

According to a multi-touch, the number of functions performed in the conventional portable terminals is limited. Examples of such functions are zooming in/out and rotating with respect to an image. It is necessary to develop functions that can be performed by a multi-touch detected on a touch screen.

SUMMARY OF THE INVENTION

The present invention provides a portable terminal with a touch screen and a method for displaying tags on the touch screen of the portable terminal using a multi-touch detected on the touch screen.

In accordance with an exemplary embodiment of the present invention, the present invention provides a method for displaying tags on a touch screen of a portable terminal, including: calculating a distance between the first and second touch points detected on the touch screen; identifying the number of tags that will be displayed, according to the calculated distance; and displaying at least one of the identified number of tags.

In accordance with another exemplary embodiment of the present invention, the present invention provides a portable terminal including: a touch screen including a display unit for displaying tags and at least one touch sensor for detecting touches; and a controller for calculating a distance between first and second touch points that are detected on the touch screen, identifying the number of tags that will be displayed, according to the calculated distance, and displaying at least one of the identified number of tags on the display unit.

BRIEF DESCRIPTION OF THE DRAWINGS

The features and advantages of the present invention will become more apparent from the following detailed description in conjunction with the accompanying drawings, in which:

FIG. 6 is a flow chart describing a method for displaying tags, according to an embodiment of the present invention.

DETAILED DESCRIPTION OF THE INVENTION

Figure 1:
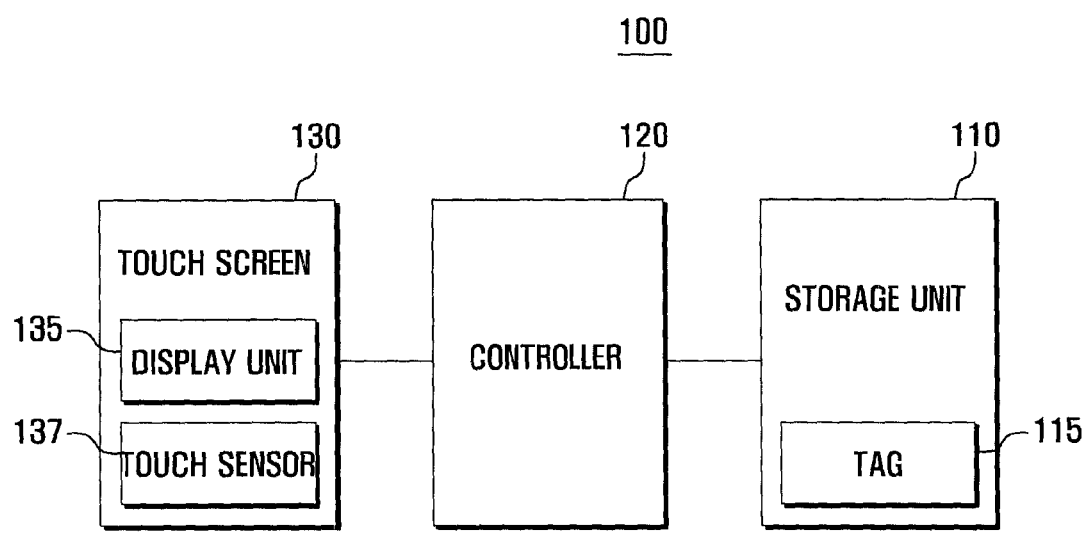
FIG. 1 is a schematic block diagram illustrating a portable terminal according to an embodiment of the present invention.

Prior to explaining the embodiments of the present invention, terminologies will be defined for the present description below:

The terms or words described in the present description and the claims should not be limited by a general or lexical meaning, instead should be analyzed as a meaning and a concept through which the inventor defines and describes the present invention at his most effort, to comply with the idea of the present invention. Therefore, one skilled in the art will understand that the embodiments disclosed in the description and configurations illustrated in the drawings are only preferred embodiments, and that there may be various modifications, alterations, and equivalents thereof to replace the embodiments at the time of filing this application, which are considered to be within the scope of the invention claimed.

In the following description, the term 'tag' refers to identification information set by data (identification data) or a menu (tag menu) of items related to the functions of the portable terminal.

The tag menu contains items to select functions that will be performed in the portable terminal. The items in the menu may be icons set according to functions. The items may also be names indicating corresponding functions. Examples of the items are a screen item, an audio item, a content storing box item, a phone book item, a message item, etc. Each of the items contains a submenu composed of sub-items. Each of the sub-items may also contain a sub-submenu composed of sub-sub-items.

The identification information set by data (identification data) refers to detailed information regarding data stored in the portable terminal, serving to identify the stored data. Examples of the identification data are names, data sizes, data types, stored dates, icons, data sort items, thumbnails, etc., which are set when the data is stored in the storage unit.

The term 'touch' refers to a state when a user's finger or a stylus contacts the touch screen. That is, a touch represents a fixed coordinate(s) during a time period.

The term 'drag' refers to a state when a user's finger or a stylus contacts the touch screen and then moves in a certain direction while contacting the screen within a certain period of time and then releases the contact. That is, a drag includes a movement of coordinates during a time period.

Exemplary embodiments of the present invention are described in detail with reference to the accompanying drawings. The same reference numbers are used throughout the drawings to refer to the same or similar parts. Detailed descriptions of well-known functions and structures incorporated herein may be omitted to avoid obscuring the subject matter of the present invention.

FIG. 1 is a schematic block diagram illustrating a portable terminal according to an embodiment of the present invention.

Referring to FIG. 1, the portable terminal 100 includes a storage unit 110, a controller 120, and a touch screen 130. The touch screen 130 includes a display unit 135 and a touch sensor 137.

The storage unit 110 stores application programs required to perform the operations of the present invention and a variety of data generated when the portable terminal is operated. In an embodiment of the present invention, the storage unit 110 stores tag 115. The tag 115 refers to identification data or a tag menu of items related to the functions of the portable terminal, which are displayed on the portable terminal so as to allow a user to select corresponding functions. The tag menu may contain items and icons according to corresponding functions. The identification data may contain names according to stored data, the date when data is generated, a set icon, a group including data, a sort item for sorting data, etc. The sort item may contain a data type sort item for sorting data according to data types, a favorite sort item for sorting frequently used data according to preferences, a date sort item for sorting data according to dates when the data is generated, etc.

The tags 115 can be classified as higher tags and lower tags according to the display order on the display unit 135.

For example, if the tag 115 is the tag menu, the higher tag may be a screen item, an audio item, a content storing box item, a phone book item, a message item, etc. In that case, the lower tag may be a submenu contained in each of the items, where the submenu contains sub-items. For example, if the higher tag is a message item, the lower tag as sub-items may be message transmission, received message box, transmitting message box, text emoticon transmission, etc.

If the tag 115 is the identification data, the higher tag may be a group containing data. In that case, the lower tag may be names according to the data contained in the group. For example, if it is assumed that tag 115 is detailed information according to MP3 data and the MP3 data is sorted by singers, the higher tag then represents groups of singers, containing MP3 data, and the lower tag represents MP3 data contained within the groups of singers.

The storage unit 110 can also store the order of priority by tags under the control of the controller 120. The order of priority by tags refers to the order in which to display the tag(s) 115 on the touch screen 130. The order of priority by tags is determined according to the frequency of tags selected by the user.

The storage unit 110 stores the number of tags that can be displayed on the display unit 135 according to a distance between the first touch point and the second touch point, under the control of the controller 120. The storage unit 110 stores the number of tags in a table described in the following Table 1.

TABLE 1

| Distance D between touch points [pixels] | No. of tags |
| --- | --- |
| 10 < D ≦ 100 | 3 |
| 100 < D ≦ 200 | 4 |
| 200 < D ≦ 300 | 5 |
| 300 < D ≦ 400 | 6 |

It should be understood that the distance D and the number of tags, described in Table 1, are an embodiment, so the present invention is not limited to this illustrated embodiment. It will be appreciated that the distance D and the number of tags may be set differently according to portable terminal manufacturers or a user's settings. For example, the illustrated example shown in Table 1 refers to a number of tags to be displayed with specific distances, wherein the tag size is a known value. It would be appreciated that the tag size may be varied and, thus, would also change the number of tags that may be displayed within a specific distance.

The controller 120 controls the operation and state of the portable terminal. When the controller 120 detects first and second touches via the touch screen 130, it displays tag(s) 115 on the display unit 135 according to the detected first and second touches. In particular, when the portable terminal is operated in a mode where a particular application program is executed, the controller 120 detects whether a first touch has occurred via the touch screen 130. If the touch screen 130 detects the first touch, the controller 120 identifies tags that will be displayed on the display unit 135 during the execution of the application program. After that, if the touch screen 130 detects the second touch, the controller 120 calculates a distance 117 between the first and second touch points.

The distance between the first and second touch points can be calculated by the following method. When the touch screen 130 detects the first and second touches, it identifies coordinates according to the detected first and second touch points and then outputs them to the controller 120. The controller 120 identifies the number of pixels between first and second coordinates that correspond to the first and second touch points, respectively, and then calculates a distance therebetween.

The controller 120 identifies the number of tags according to the calculated distance and then displays the identified number of tags on the display unit 135. For example, if the distance between the first and second touch points is 280 pixels, the controller 120 refers to Table 1 stored in the storage unit 110. From Table 1, when the controller 120 ascertains that the number of tags corresponding to 280 pixels is five, it controls the display unit 135 to display five tags. The controller 120 may also identify the order of priority by tags stored in the storage unit 110 and then display five tags on the display unit 135 according to the identified order of priority. Additionally, the controller 120 may randomly select five tags from the tags stored in the storage unit 110 and then display the selected five tags on the display unit 135. In an embodiment of the present invention, although the distance between the first and second touch points is explained based on the pixel unit, it should be understood that the present invention is not limited to this embodiment. For example, the distance between the first and second touch points may be calculated using conventional units, such as inches and millimeters (mm).

If one of the tags 115 displayed on the display unit 135 is then selected, the controller 120 performs a function corresponding to the selected tag 115. The function may be an operation to display the lower tag contained within the selected tag 115 by re-detecting the first and second touches. For example, if the selected tag 115 is an item in a menu, the controller 120 controls the display unit 135 to display a submenu corresponding to the item, where the submenu contains sub-items. The function may also be an operation to display or reproduce data corresponding to the tag 115.

In one aspect of the invention, the touch screen 130 is implemented with a capacitive touch screen to detect a plurality of touches. The touch screen 130 includes a display unit 135 and a touch sensor 137.

The display unit 135 displays a variety of data related to the states and operations of the portable terminal. In particular, the display unit 135 is composed of a plurality of pixel units that display tag 115 under the control of the controller 120. The method for displaying tag 115 on the display unit 135 will be explained with reference to FIGS. 2A and 2B to FIGS. 5A and 5B.

The touch sensor 137 is incorporated into the display unit 135 and detects input events according to touches or releases by a user's finger or a tool. If the touch sensor 137 detects a first touch, it outputs to the controller 120a coordinate corresponding to an area where the first touch has occurred. If the touch sensor 137 detects the second touch while the first touch is retained, it outputs to the controller 120a coordinate corresponding to an area where the second touch has occurred.

The touch screen 130 can detect a plurality of touches as follows. It is assumed that the touch screen 130 is implemented with a capacitive touch screen. In that case, the capacitive touch screen 130 is configured to include a capacitance switch, such as a capacitor, for each pixel of the display unit 135, and detects changes in the capacitance. The capacitive touch screen 130 has coordinates allocated to its areas corresponding to pixels of the display unit 135, respectively, so as to detect a touch.

If a change of capacitance has been determined by the touch screen 130 according to a first touch, the touch screen 130 identifies a capacitance switch that detects the change of capacitance. After that, the touch screen 130 outputs a first coordinate corresponding to the area where the identified capacitance switch is located to the controller 120. If the touch sensor 137 detects the change of capacitance according to the second touch while the first touch is retained, it identifies an area where the capacitance is changed by the second touch. After that, the touch sensor 137 outputs the second coordinate corresponding to the area where the capacitance has changed according to the second touch.

In the foregoing description, the configuration of the portable terminal that can display tag(s) 115 according to a multi-touch has been explained. In the following description, the method for displaying tag(s) 115 on the display unit 135 will be described in detail with reference to FIGS. 2A to 5B.

Figure 2A:
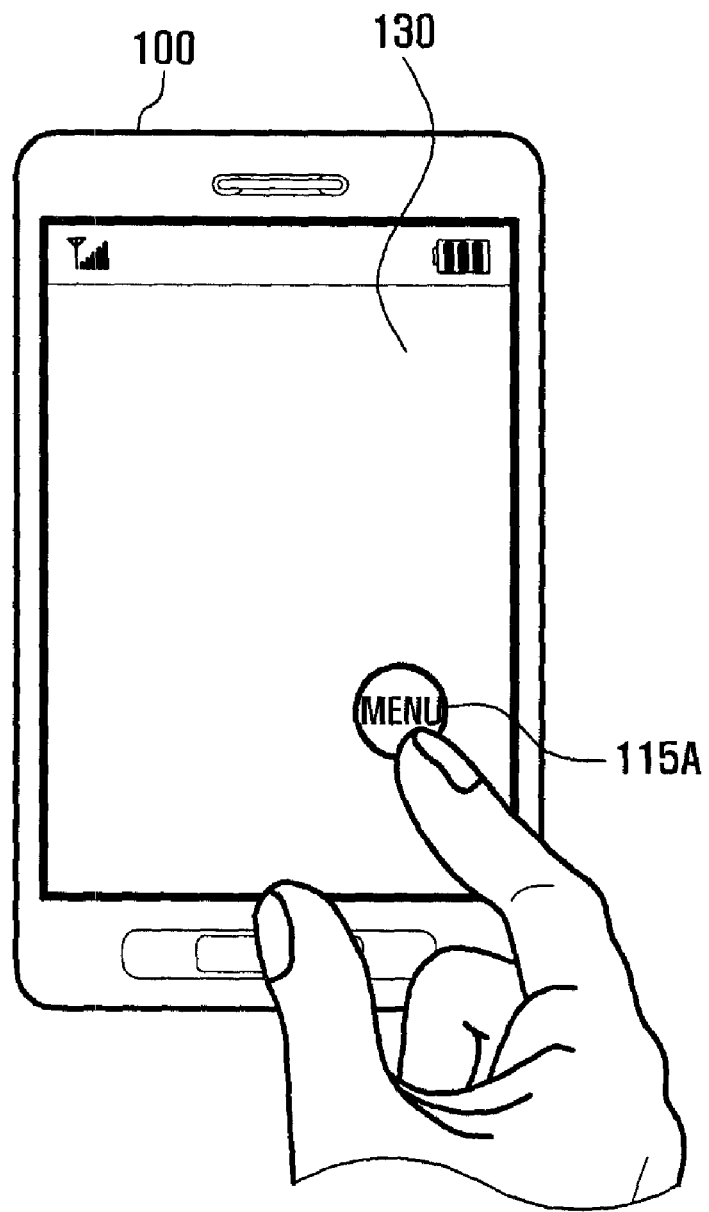
FIGS. 2A and 2B are views illustrating a touch screen that displays tags, according to an embodiment of the present invention.
Figure 2B:
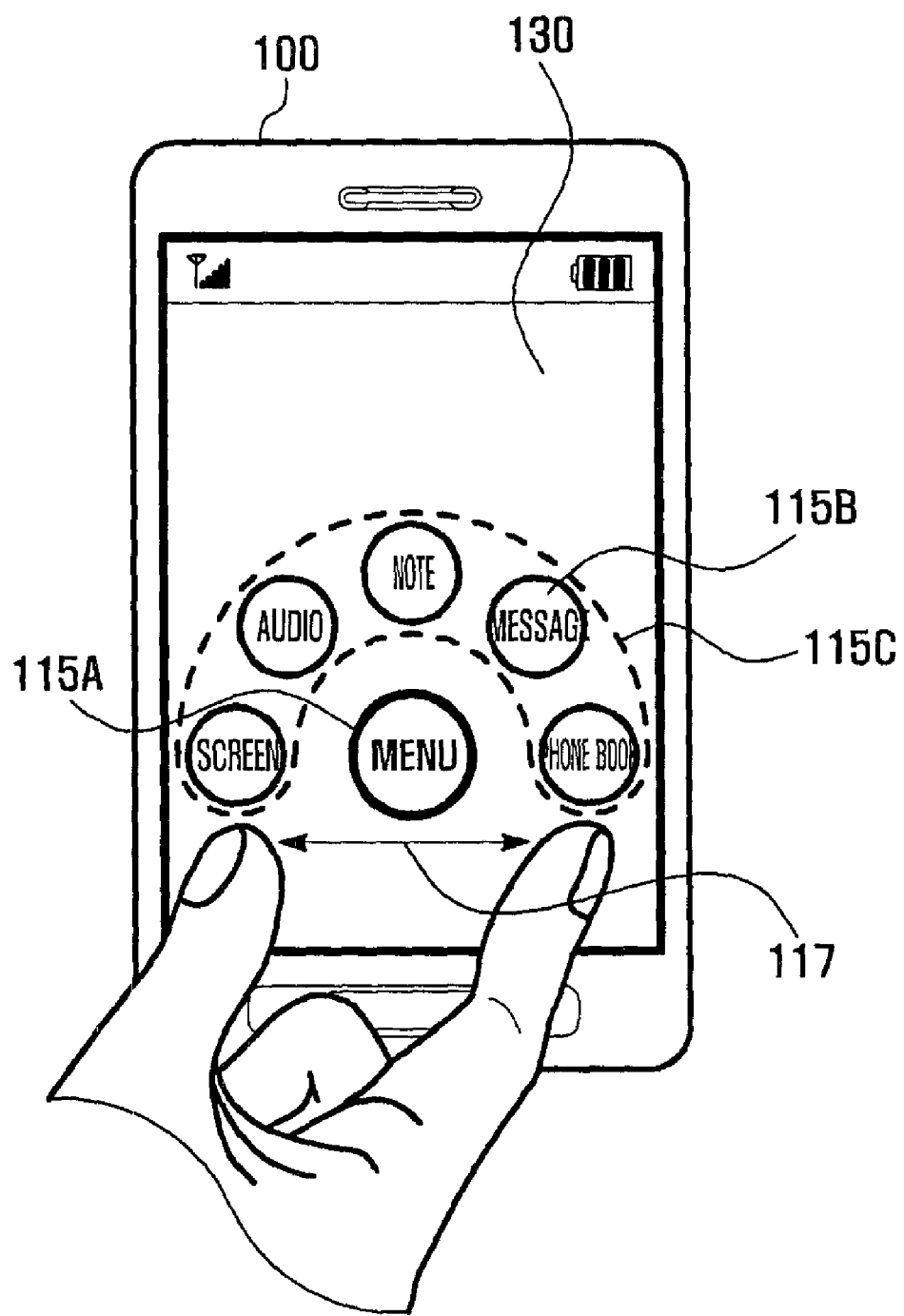

FIGS. 2A and 2B are views illustrating a touch screen that displays tags, according to an embodiment of the present invention.

As shown in FIG. 2A, when the controller 120 detects the first touch, it controls the display unit 135 to display tag 115A, referred to as "MENU," on an area when the first touch has occurred. After that, as shown in FIG. 2B, when the controller 120 detects the second touch, it controls the display unit 135 to display tag 115a according to a distance between the first and second touch points. For example, as shown in FIG. 2A, when the portable terminal is operated in an idle mode, the display unit 135 displays tag 115A, as "MENU", according to the first touch.

After that, as shown in FIG. 2B, according to the second touch, the display unit 135 displays five higher tags 115B, i.e., a screen item, an audio item, a note item, a message item, and a phonebook item, in an arc shape. The display unit 135 can adjust and display the number of tags 115 according to the distance between the first and second touch points. That is, the smaller the distance the less number of tags 115 the display unit 135 displays. In other words, the larger the distance the greater number of tags 115 the display unit 135 displays. In particular, the tags 115 can be displayed on the display unit 135 according to the order of priority.

Figure 3A:
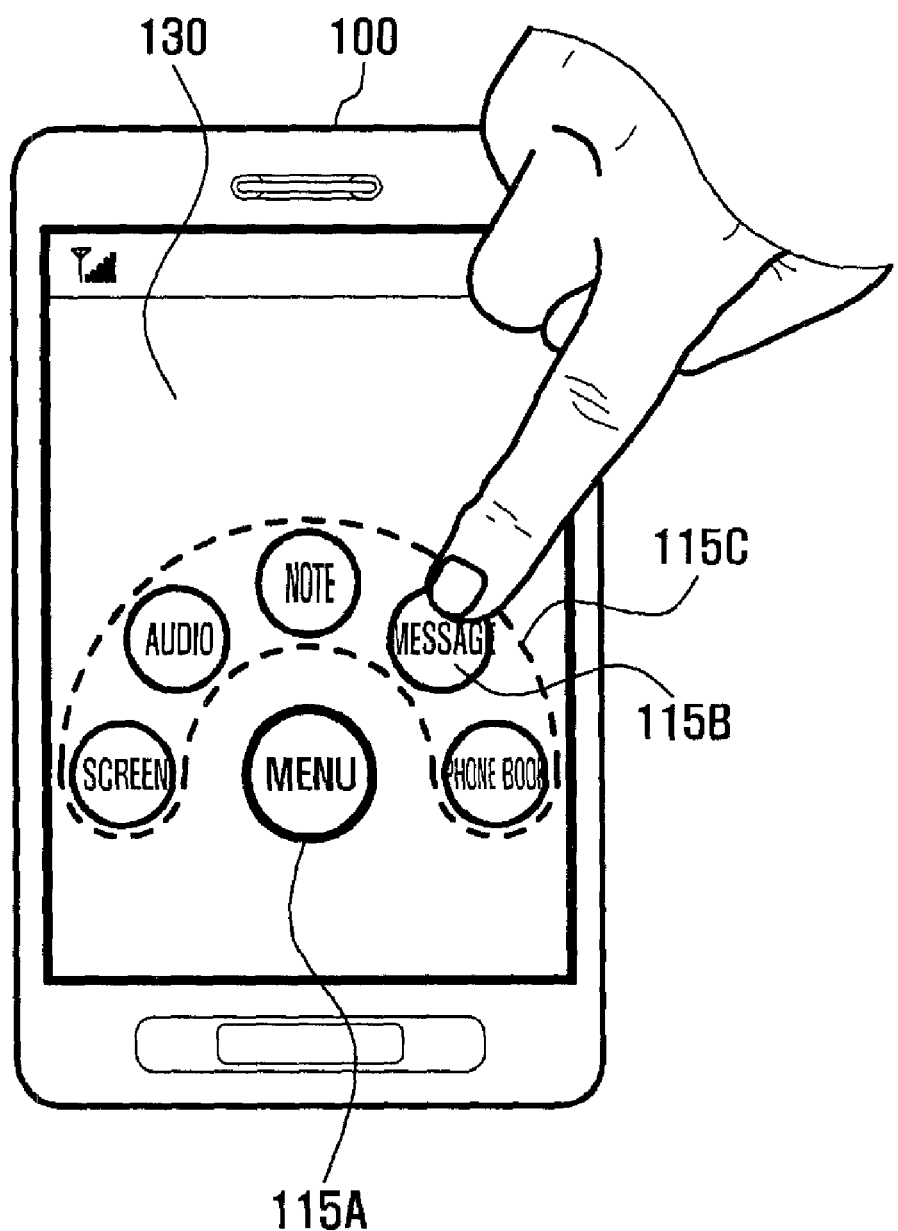
FIGS. 3A to 3C are views illustrating a touch screen that displays tags according to a distance between the first and second touch points, according to an embodiment of the present invention.
Figure 3B:
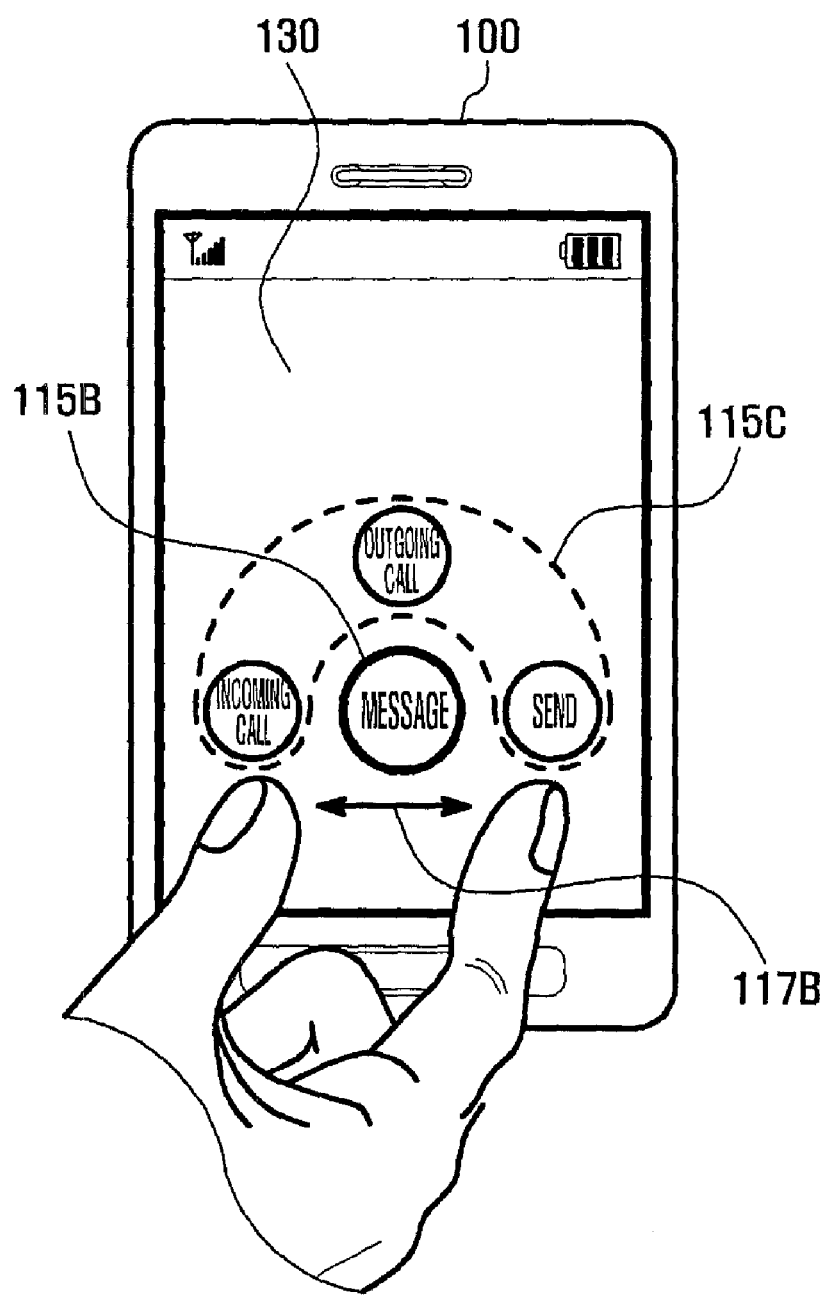
Figure 3C:
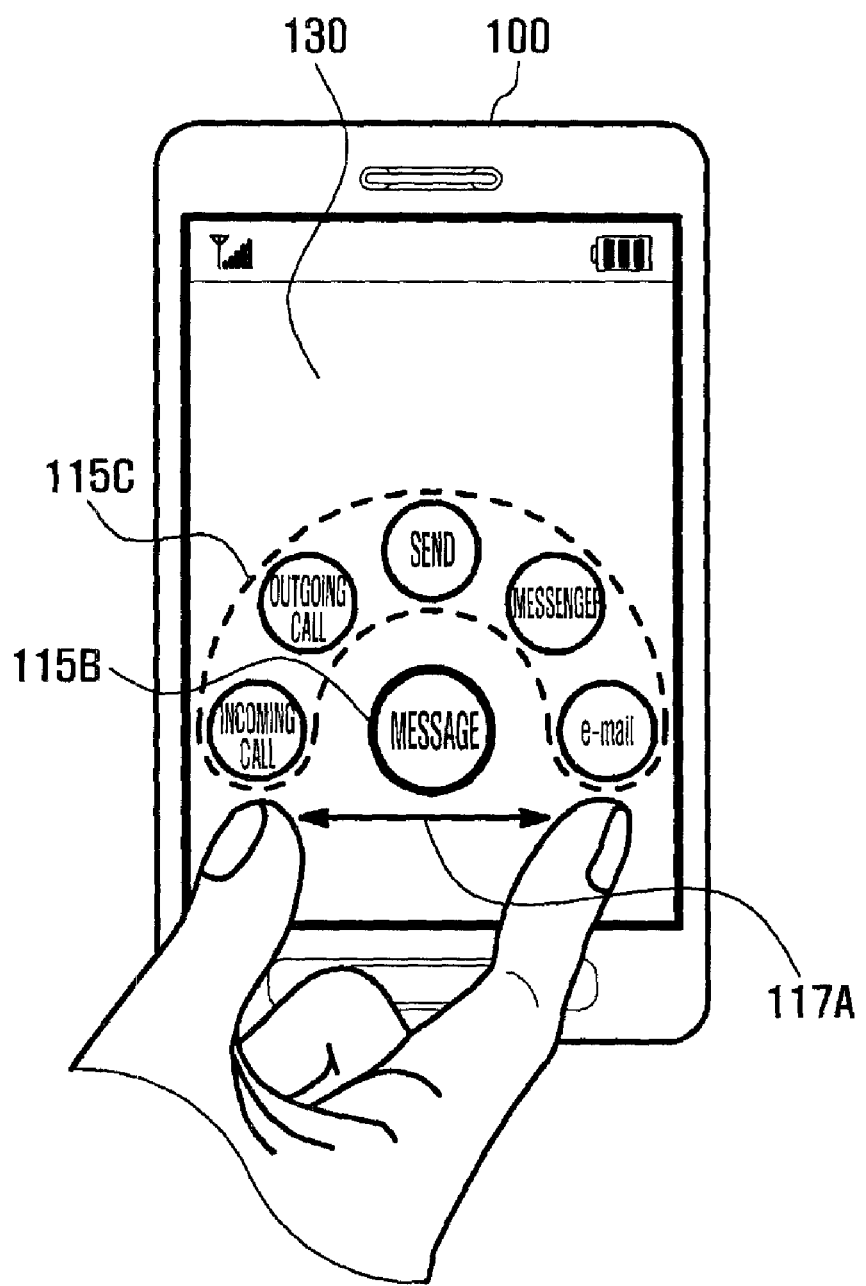

FIGS. 3A to 3C are views illustrating a touch screen that displays tags according to a distance between first and second touch points, according to an embodiment of the present invention.

If a particular item of the higher tags 115B is selected as shown in FIG. 3A, the display unit 135 displays lower tag(s) 115c, i.e., a sub-menu containing sub-items, corresponding to the selected item, in an arc shape, as shown in FIG. 3B. That is, when the particular item (e.g., message) is selected as shown in FIG. 3A, all the items of the higher tag 115B are removed and then the lower tag 115C, i.e., the submenu 115C containing sub-items, corresponding to the selected particular item (e.g., message), is displayed on the display unit 135 as shown in FIG. 3B.

The number of tags 115 displayed on the display unit 135 may be set according to the number of the user's frequently used tags 115. For example, if a message item of the higher tag 115B as shown in FIG. 3A, a submenu, as a lower tag 115C, composed of three sub-items, i.e., a received message box, a transmitting message box, and a message transmission, is displayed on the display unit 135 as shown in FIG. 3B. The display unit 135 may also display the lower tag 115C according to the distance between the first and second touch points.

As shown in FIG. 3C, if the distance between the first and second touch points is varied, 117A, the display unit 135 may additionally display the tags 115 according to the increased distance. For example, as shown in FIG. 3B, in a state where three tags 115 are displayed on the display unit 135, if the touch screen 130 detects the first and second touch points, the controller 120 calculates a distance between the detected first and second touch points. If the calculated distance between the detected first and second touch points is increased, 117A, from the original distance, two more tags 115 are additionally displayed, so that five tags 115 total are displayed on the display unit 135 as shown in FIG. 3C.

In an embodiment of the present invention, the tags 115 are displayed on the display unit 135 in an arc shape, it should be understood that the present invention is not limited to the illustrated embodiment. For example, as shown in FIG. 4, the tags 115 may also be arranged in a straight line.

Figure 4:
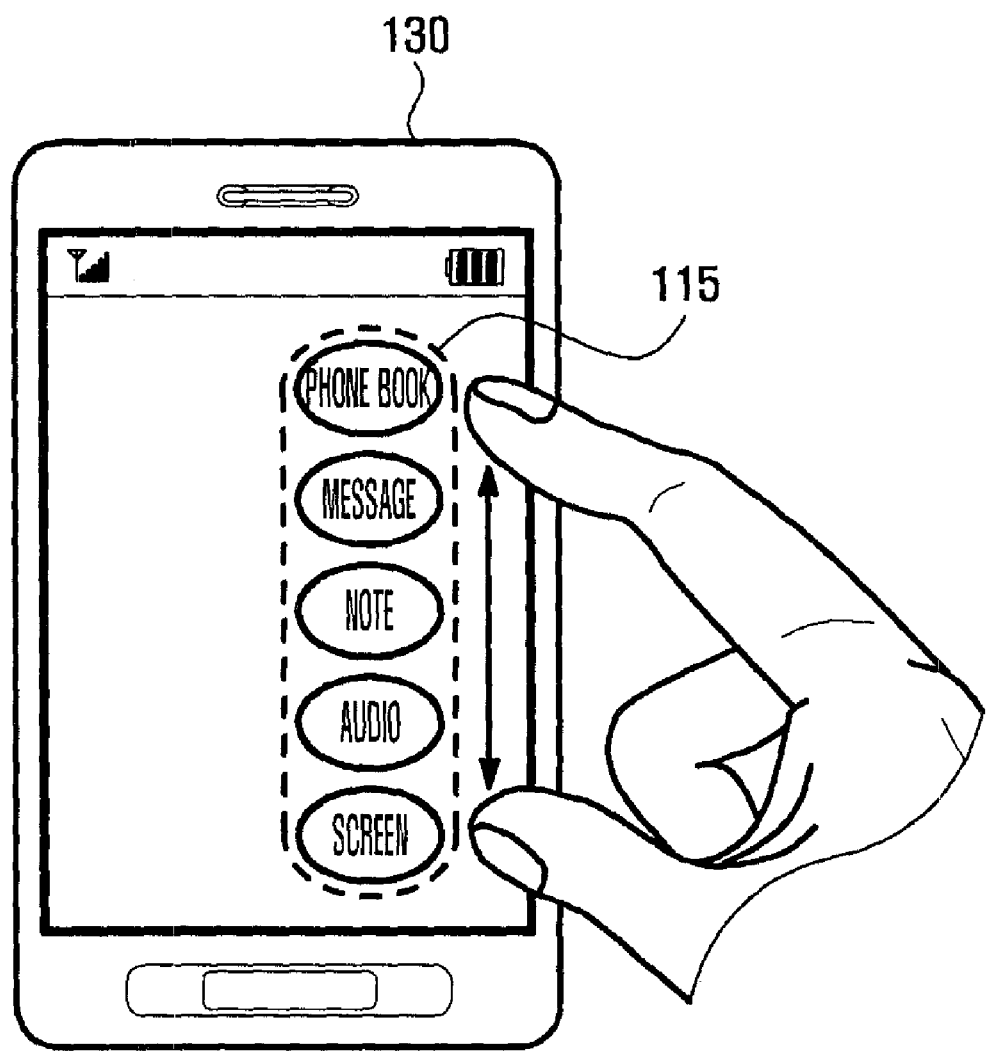
FIG. 4 is a view illustrating a screen that displays tags, according to another embodiment of the present invention.

FIG. 4 is a view illustrating a screen that displays tags according to another embodiment of the present invention.

Although an embodiment of the present invention, as shown in FIG. 4, is implemented in such a way that the tags 115 are arranged in the vertical direction, it should be understood that the present invention is not limited to the illustrated embodiment. For example, the tags 115 may also be arranged in a diagonal direction or in a horizontal direction. Furthermore, as shown in FIG. 4, the display unit 135 may also display only tags 115 selected by a user. That is, as shown in FIGS. 2A to 3C, the display unit 135 displays a menu, as tags 115, a message item, as the higher tag 115C, which is selected by a user, and sub-items of the message item, as the lower tag 115C. However, as shown in FIG. 4, the display unit 135 can also display only the lower tag 115C that is contained in the particular tag.

For example, if the selected tag 115 is a menu, the display unit 135 may display items contained in the menu, as the higher tag 115B, for example, a phone book item, a message item, a note item, an audio item, and a screen item. In such a state, the controller 120 adjusts the displayed number of tags according to the distance between the first and second touch points and then displays it on the display unit 135. The tags 115 are displayed according to the order of priority or how frequently the user selects tags 115. The tags 115 may also be randomly selected and displayed. According to the order of priority, the tags 115 may be displayed from top to bottom or vice versa.

In the following description, a method is explained that re-displays tags according to a detected touch while the tags 115 are being displayed.

Figure 5A:
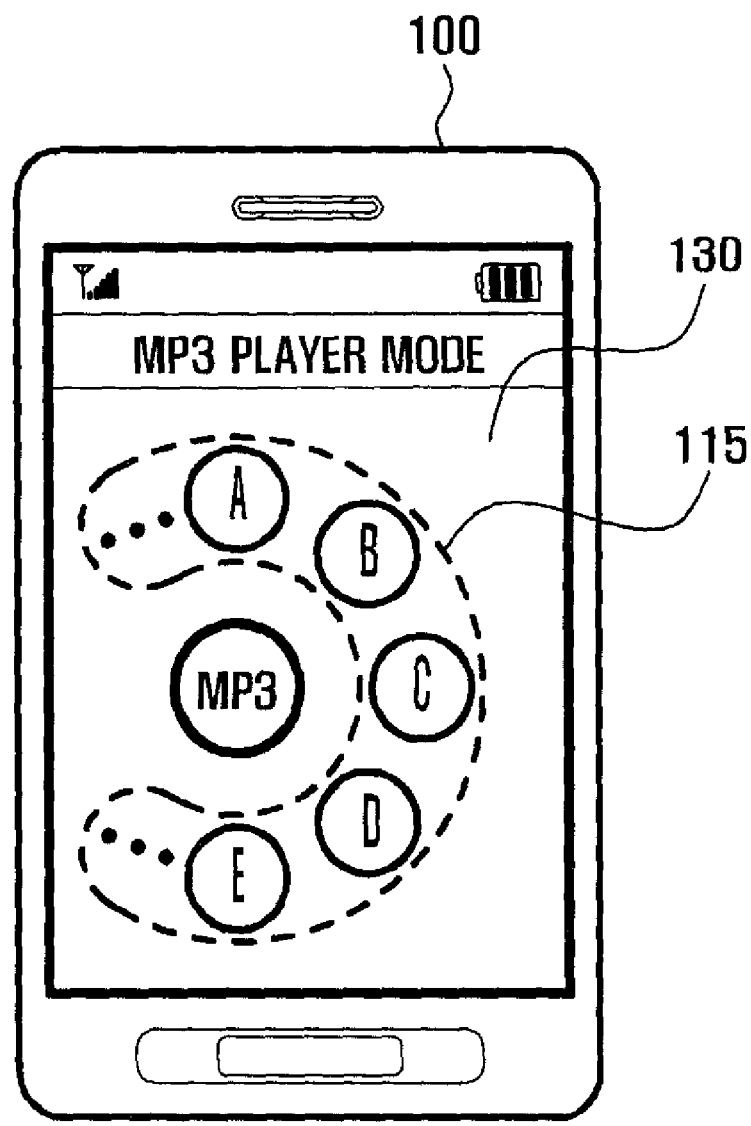
FIGS. 5A and 5B are views illustrating a screen that re-displays tags, according to an embodiment of the present invention.
Figure 5B:
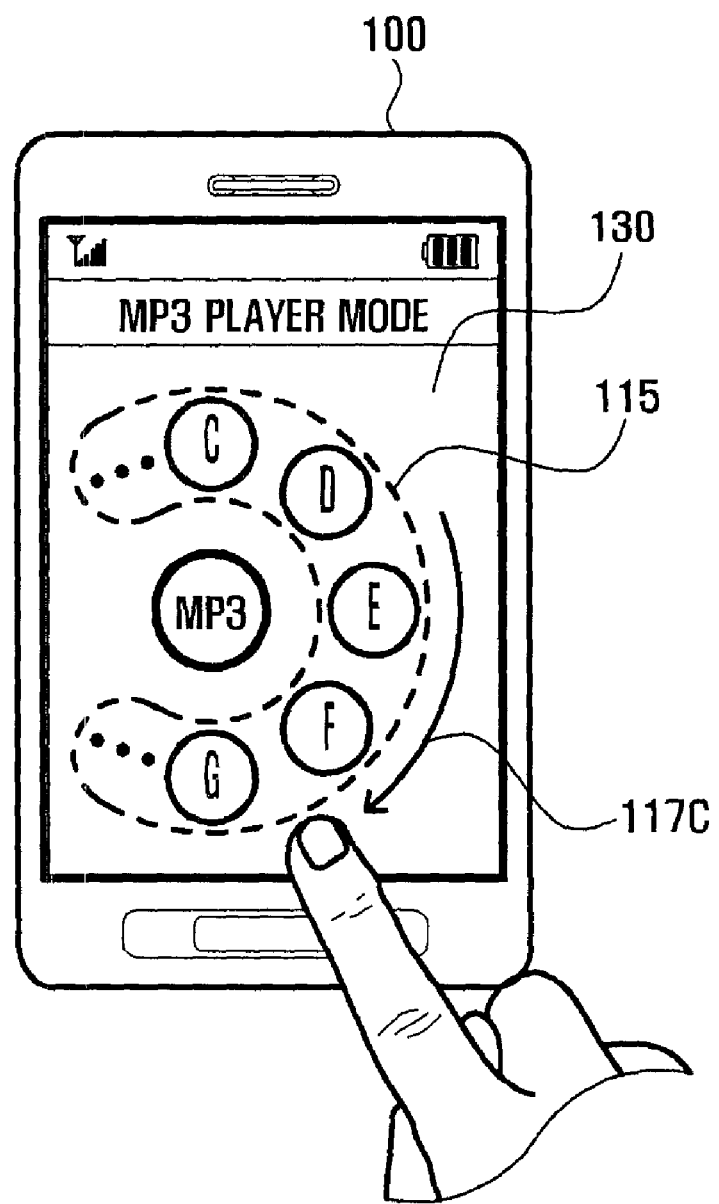

FIGS. 5A and 5B are views illustrating a screen that re-displays tags, according to an embodiment of the present invention.

When a drag is detected in a state where tags 115 are displayed on a touch screen 130 as shown in FIG. 5A, the display unit 135 re-arranges the displayed tags 115 according to the detected drag direction and distance as shown in FIG. 5B. For example, as shown in FIG. 5A, when singers, represented as A, B, C, D, and E, as tag 115, are displayed on the display unit 135, a user performs a dragging operation with his/her finger. When the controller 120 detects the drag, it identifies the dragging direction and dragged distance. If the controller 120 ascertains that the drag direction is clockwise and the dragged distance correspond to a distance to re-arrange two tags 115, the controller re-arranges the tags 115 on the display unit 135 according to the identified drag direction and dragged distance. That is, according to the drag direction and dragged distance, singers, represented as A and B, as tag 115, shown in FIG. 5A, are removed from the display unit 135, and then new singers, represented as F and G, as tag 115, appear on the display unit 135, as shown in FIG. 5B. Consequently, as shown in FIG. 5B, singers, as represented as C, D, E, F, and G, as tag 115, are rearranged and displayed on the display unit 135.

In the foregoing description, the operation of the display unit 135 displaying tags 115 has been explained. In an embodiment of the present invention, although tags 115 are arranged in an arc shape or in a straight line on the display unit 135, it should be understood that the present invention is not limited to the embodiment illustrated. For example, on the display unit 135, the tags 115 may also be arranged in a circle or located at any area.

In the following description, a method for displaying tags 115 according to the distance between touch points will be explained with reference to FIGS. 6 and 7.

FIG. 6 is a flow chart describing a method for displaying tags, according to an embodiment of the present invention.

Referring to FIG. 6, the controller 120 switches a current mode of the portable terminal to a mode to perform an application selected by a user (610). The application performing mode includes all modes that can be operable in the portable terminal, such as an idle mode, an MP3 data reproducing mode, an image displaying mode, etc. In an embodiment of the present invention, the application performing mode is an MP3 data reproducing mode where selected MP3 data is played back. However, it would be recognized that this mode is for illustrative purposes only.

After that, the controller 120 determines whether the touch screen 130 detects a first touch event (620). If the controller 120 ascertains that the touch screen 130 detects the first touch event at 615, it identifies tags 115 that will be displayed on the display unit 135 (630). For example, the controller 120 identifies the order of priority for tags 115 corresponding to MP3 data that will be played back in the MP3 data reproducing mode. The order of priority for tags 115 may be the order according to the frequency how frequently the user selects MP3 data. After that, the controller 120 can display the identified tags 115 by a preset number. That is, the controller 120 displays a preset number of identified tags 115.

Next, the controller 120 determines whether the touch screen 130 detects a second touch event (635). If the second touch event is not detected, the controller 120 determines whether the first touch detected on the touch screen 130, is released (637). When the controller 120 ascertains that the first touch is released, it performs a corresponding function of the identified tag at step 639. For example, if the identified tag 115 contains lower tags, the controller 120 displays the lower tags of the identified tag on the display unit 135.

If the controller 120 ascertains that the touch screen 130 detects the second touch event at 635, it calculates a distance between the first and second touch points (640). The distance between the first and second touch points can be calculated as follows. The controller 120 receives coordinates corresponding to areas on the touch screen 130 where the first and second touch points are detected. After that, the controller 120 identifies the number of pixels between the two coordinates and then calculates the distance therebetween.

After calculating the distance at 640, the controller 120 displays tags 115 according to the calculated distance on the display unit 135 (645). The following detailed description regarding the method for displaying tags 115 at 645 refers to FIG. 7.

Figure 7:
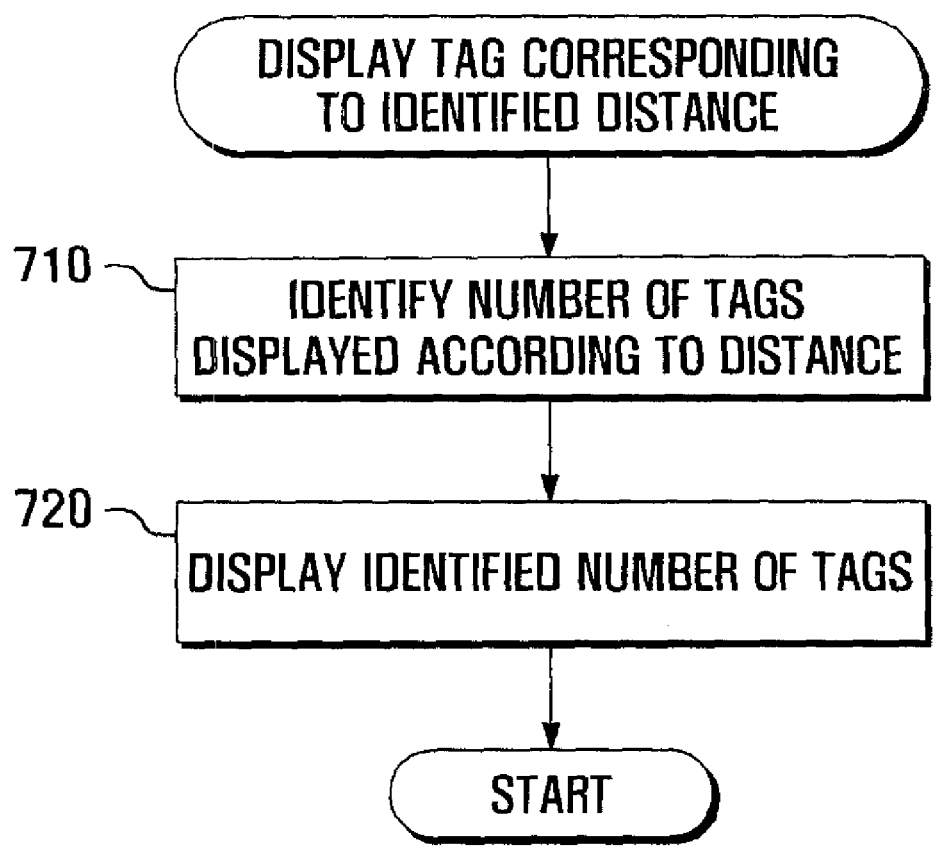
FIG. 7 is a flow chart describing a method for displaying tags, based on a distance between touch points, according to an embodiment of the present invention.

FIG. 7 is a flow chart describing a method for displaying tags, based on a distance between touch points, according to an embodiment of the present invention.

Referring to FIG. 7, the controller 120 identifies the number of tags 115 that will be displayed on the display unit 135 according to the calculated distance (710). In order to display tags 115 on the display unit 135, the controller 120 may refer to a table stored in the storage unit 110. That is, when the controller 120 calculates the distance, it identifies the number of tags, mapped to the calculated distance, through the table stored in the storage unit 110. After that, the controller 120 displays the identified number of tags 115 on the display unit 135 (720).

Referring back to FIG. 6, after displaying the tags 115 at 645, the controller 120 determines whether the first and second touches, detected on the touch screen 130, are released (650). If the controller 120 ascertains that the first and second touches are not released at 650, it returns to and proceeds with step 640. Through these processes, the controller 120 can change the number of tags 115 on the display unit 135 according to the altered distance between the first and second touch points.

If the controller 120 ascertains that the first and second touches are released at 650, it determines whether one of the items in the tags 115 that are displayed on the display unit 135 (655) is selected. If the controller 120 ascertains that one of the tags 115 is selected at 655, it performs a corresponding function of the selected tag (660). For example, if the selected tag 115 is MP3 data, the controller 120 plays the selected MP3 data. If the selected tag 115 is images, the controller 120 displays the selected image on the display unit 135. If the selected tag 115 contains lower tags 115c, the controller 120 displays a submenu of the selected item on the display unit 135. The controller 120 can adjust the number of sub-items, as lower tags, according to the distance between the first and second touch points that are detected on the touch screen 130, and then display the adjusted number of sub-items on the display unit 135. However, if the controller 120 ascertains that one of the tags 115 is not selected at 655, it determines whether a drag command is detected on the touch screen 130 (670). If the controller 120 ascertains a drag command is detected on the touch screen 130 at 670, it re-arranges the tags 115 on the display unit 135 according to the detected drag (675). More specifically, when the controller 120 detects a drag, it identifies the drag direction and dragged distance. The controller 120 identifies the order of priority with respect to the other tags 115 other than the tags 115 displayed on the display unit 135. After that, the controller 120 removes the tags 115 originally displayed on the display unit 135, according to the movement direction and distance of the detected drag. The controller 120 displays the tags 115 on the display unit 135 by adding new tags according to the removed number of tags.

As described above, the portable terminal with a touch screen, according to the present invention, can adjust the number of tags displayed on the display unit using a distance between touch points, thereby providing a variety of user interfaces to the portable terminal user. As the number of tags is adjusted on the display unit, the portable terminal user can rapidly and easily identify and select tags for which he/she wishes to search.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. As would be recognized by those skilled in the art, when a general purpose computer is loaded with, or accesses, software or code for implementing the processing shown herein, the general purpose computer is transformed into a special purpose computer that may at least perform the processing shown herein.

Although exemplary embodiments of the present invention have been described in detail hereinabove, it should be understood that many variations and modifications of the basic inventive concept herein described, which may be apparent to those skilled in the art, will still fall within the spirit and scope of the exemplary embodiments of the present invention as defined in the appended claims.

What is claimed is:

1. A method for displaying tags on a touch screen of a portable terminal, comprising:
   calculating, when first and second touches are detected on the touch screen, a distance between first and second touch points of the first and second touches, respectively;
   identifying a number of tags that will be displayed according to the calculated distance between the first and second touch points; and
   displaying the identified number of tags;
   wherein the number of tags comprises touch activated tags, wherein the first touch point causes display of a tag menu comprised of the number of tags and the second touch point in conjunction with the first touch point controls the number and position of the tags according to the calculated difference between the first and second touch points.

2. The method of claim 1, further comprising, after the identified number of tags are displayed:
   changing the number of tags displayed according to changes in the calculated distance.

3. The method of claim 1, further comprising, after the tags are displayed:
   determining whether a drag is detected;
   identifying, if a drag is detected, the movement direction and distance of the detected drag, the drag having a moving coordination during a time period;
   removing at least one tag from the displayed tags; and
   adding a number of new tags on the display unit according to a number of removed at least one tag in the movement direction.

4. The method of claim 1, wherein displaying at least one of the identified number of tags includes one of: arranging tags in an arc shape or in a straight line.

5. The method of claim 1, wherein at least one tag comprises an item in a sub-menu containing sub-items related to the item, or identification data; and
   each respective sub-menu of sub-items that subsequent to a sub-menu selection are displayed by re-detecting the two first and second touch points to determine a number and position of the sub-items of the selected sub menu that are displayed based on a distance between the two re-detected touch points.

6. A portable terminal comprising:
   a touch screen including a display unit for displaying tags and at least one touch sensor for detecting touches on the touch screen; and
   a controller in communication with the touch screen for:
      calculating a distance between first and second touch points that are detected on the touch screen,
      identifying a number of tags to be displayed, according to the calculated distance, and
      displaying the identified number of tags on the display unit;
   wherein the first touch point causes display of a tag menu comprised of the tags, and the second touch point in conjunction with the first touch point controls the number of tags to be displayed and their position on the display unit according to the calculated difference between the first and second touch points.

7. The portable terminal of claim 6, wherein, if the calculated distance is changed, the controller changes the number of tags to be displayed according to the changed distance and displays the changed number of tags on the display unit.

8. The portable terminal of claim 6, wherein, after the tags are displayed, if a drag is detected, the controller:
   identifies the movement direction and distance of the detected drag, the drag having a moving coordination during the time period,
   removes at least one tag from the displayed tags; and
   adds a number of new tags on the display unit according to a number of removed at least one tag in the movement direction.

9. The portable terminal of claim 6, wherein the controller arranges tags in one of: an arc shape or in a straight line.

10. The portable terminal of claim 6, wherein the tag is a tag menu or identification data.

11. A portable terminal including:
a touchscreen input device comprising a plurality of pixels:
a controller comprising:
   a processor in communication with a memory, the memory including code, which when accessed by the processor causes the processor to execute the steps of:
     receiving signals from the touchscreen, the signals associated with selected ones of the pixels;
     determining a first touch and a second touch of the touchscreen;
     determining a distance between the first and second touches;
     determining a number of tags to be displayed based on the distance, wherein the number of tags is predetermined for each of a plurality of distances;
     determining an order of displaying the number of tags; and
     displaying the determined number of tags in the determined order;
wherein the number of tags comprises touch activated tags, wherein the first touch point causes display of a tag menu comprised of the number of tags and the second touch point in conjunction with the first touch point controls the number and position of the tags according to the calculated difference between the first and second touch points.

12. The portable terminal of claim 11, the processor further executing code for:
determining a change in distance between the first and second touches; and
determining a number of tags to be displayed based on the changed distance.

13. The portable terminal of claim 11, wherein the order is determined based on the frequency of selection of the tags.

14. The portable terminal of claim 11, wherein the tags are displayed in one of: an arc and a straight line.

15. A method for displaying items on a touch screen of a portable terminal, comprising:
detecting first and second touches at first and second touch points, respectively, on the touch screen, wherein the first touch point causes display of a menu comprised of touch activated items and the second touch point in conjunction with the first touch point controls a number and position of one or more of the touch activated items related to the menu to be displayed according to the calculated difference between the first and second touch points;
calculating a distance between the first and second touch points;
determining the number and position of said one or more touch activated items to be displayed according to the calculated distance between the first and second touch points; and
displaying said one or more items determined according to the calculated distance between the first and second touch points.

16. The method of claim 15, wherein at least some of the touch activated items are selectable menu entries having a respective sub-menu of sub-items that subsequent to a sub-menu selection are displayed by re-detecting the two first and second touch points to determine a number and position of the sub-items of the selected sub menu that are displayed based on a distance between the two re-detected touch points.

17. The method of claim 16, wherein touch selection of a menu entry causes a display screen change wherein a plurality of sub-menu entries related to the selected menu entry are displayed.

18. The method of claim 15, wherein at least some of the touch activated items when selected display identification information.

19. The method of claim 15, wherein at least some of the touch activated items are displayed in the form of icons that perform particular functions upon further touch selection thereof.

20. The method of claim 15, wherein the number of touch activated items displayed is proportional to the calculated distance between the first and second touch points.

21. The method of claim 1, wherein the second touch is detected while the first touch is retained.

22. The portable terminal of claim 6, wherein the second touch point is detected while the first touch point is retained.

23. The portable terminal of claim 11, wherein the second touch is detected while the first touch is retained.

24. The method of claim 15, wherein the second touch is detected while the first touch is retained.

\* \* \* \* \*